Oct. 9, 1928.
J. H. HUSSEY
1,686,860
ELECTRICAL HEATER
Filed Sept. 13, 1927
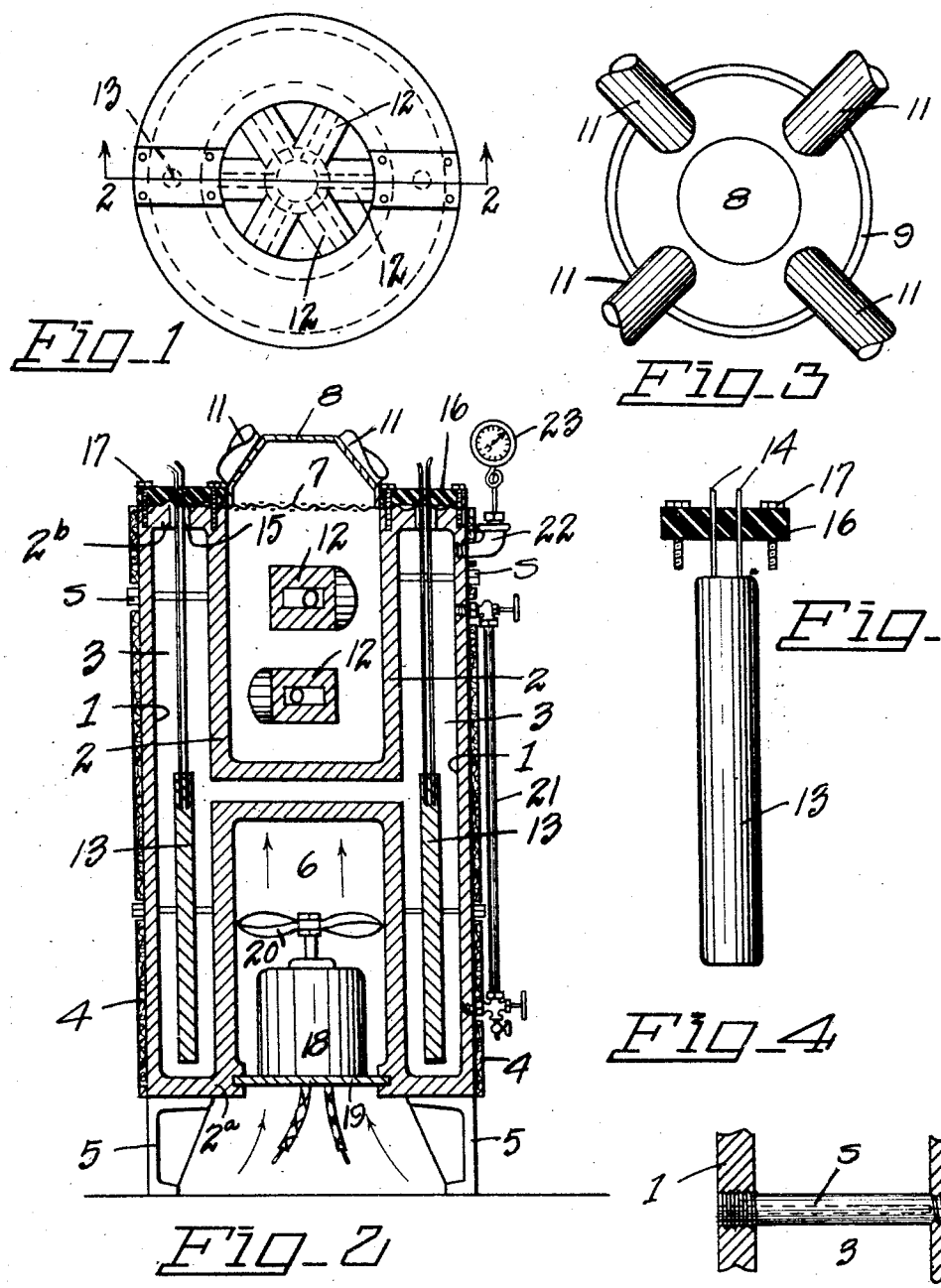
Inventor
James Hanson Hussey
By Herbert E. Smith
Attorney Patented Oct. 9, 1928.

1,686,860

UNITED STATES PATENT OFFICE.

JAMES HANSON HUSSEY, OF SPOKANE, WASHINGTON, ASSIGNOR OF ONE-HALF TO JOSHUA HUBBS, OF SPOKANE, WASHINGTON.

ELECTRICAL HEATER.

Application filed September 13, 1927. Serial No. 219,194.

My present invention relates to improvements in electrical heaters designed especially for heating water in domestic heating devices employing hot air for distributing the heat radiated from the heater.

The device of my invention is designed to provide a small compact and sanitary heating apparatus whereby the cold air or cooled air may be taken from the floor level and passed through the heater and then distributed to the several rooms in a house or other building, thus insuring a circulation of air within the house, venting of the house, and an efficient heating system for the house.

In carrying out my invention, I utilize an electric water heater and employ means for directing air currents against the radiating surfaces which are heated by the hot water. The heater utilizes an annular water chamber and a central interior air chamber through which the air currents are passed for the purpose of being heated.

The invention consists in certain novel combinations and arrangements of parts as will hereinafter be more fully pointed out and claimed.

In the accompanying drawings, I have illustrated one complete example of the physical embodiment of my invention wherein the parts are combined and arranged according to the best mode I have so far devised for the practical application of the principles of my invention.

Figure 1 is a top plan view of the electrical heater with the hot air hood and flues omitted;

Fig. 2 is a vertical sectional view of the heater on line 2—2 of Fig. 1;

Fig. 3 is a top plan view showing the dome or hood and the hood air flues connected thereto;

Fig. 4 is a detail sectional view showing one of the stay bolts between the spaced annular walls of the heater; and Fig. 5 is a view of one of the electric heating elements, detached.

In carrying out my invention, I utilize a double wall heater of cylindrical shape comprising the outer wall 1 and the inner wall 2, between which is formed an annular water chamber 3. The usual stay bolts S are employed for bracing the walls of the heater, and the annular water chamber 3 is closed at the bottom by a circular plate $2^a$ and at the top by a circular plate $2^b$. The heater is encased within or enclosed by an insulating wall 4 fashioned of suitable material to prevent excessive radiation of heat which is generated in the water in the chamber 3.

The heater is elevated from the ground or floor a suitable distance to permit circulation of air thereunder, and is supported upon legs 5 to permit the air currents to pass under the heater and up through the central internal air chamber 6. This chamber is opened at the bottom, but at its upper end, a screen 7 is arranged, and a dome 8 having a flange 9 is bolted to the circular plate $2^b$, to close the upper end of the central air chamber. The currents of hot air passing into the dome 8 enter the hot air flues 11, and the heated air is conveyed to the desired destination as the separate rooms of a dwelling.

To enlarge the radiated surfaces within the heater, in addition to the interior surface of the inner cylinder 2, I provide transversely extending water tubes 12 which extend diametrically of the interior air chamber, and afford communication at opposite points between the annular water chamber. In this manner, the water is permitted to circulate and the exterior faces of the water tubes provide heat radiating surfaces against which the air in the central internal air chamber contacts, and the air of course is heated by this contact.

The electrical elements for heating the water in the water chamber are indicated as 13, and a suitable number of these elements may be employed. The elements are submerged in the water in the water chamber and their wires 14 are passed through openings 15 in the top plate $2^b$ and thence through insulated caps 16 which are secured by bolts 17 to the top plate $2^b$. In order to increase the circulation of air currents, I provide an electric motor 18 in the lower end of the air chamber which is supported upon a bracket 19 and this motor has a fan or impeller 20. It will be apparent that the impeller will be instrumental in causing an upward flow of air currents from the floor level through the interior air chamber where the air currents are heated, and thence through the hot air flues. The usual accessories are employed in connection with the heater such as the water tube or gage 21 and the filling nozzle 22, and a pressure indicator 23 is also shown in Fig. 2.

During warm weather when the air currents are not to be heated, the impeller 20 may be operated by the motor 18 to cause circulation of air, and it will be apparent that the cool air is drawn in under the heater and passed up through the air chamber and by means of the air flues the cool air is distributed to the various parts of a house. Thus the device may be located in an artificially cooled chamber and the impeller 20 used to distribute the cooled air currents through the air flues 11, thus creating a circulation of air through a house and uniformly cooling the entire house with the artificially refrigerated air currents.

Having thus fully described my invention, what I claim as new and desire to secure by Letters Patent is—

1. The combination with a heater comprising spaced double walls to form an annular water chamber, of heating elements in said water chamber, a dome closing the top of the central air chamber formed within the inner wall, hot air flues connected to said dome, and means for causing circulation of air within the air chamber whereby radiated heat is conveyed to the hot air flues.

2. The combination in a heater comprising a pair of double walls forming a water chamber, of diametrically arranged water tubes extending across the air chamber within the inner wall, means for heating the water within the annular chamber, a dome closing the upper end of the air chamber, and heat distributing flues extending from said dome.

3. A heater comprising inner and outer cylindrical walls forming an annular water chamber and an internal hot air chamber, of an electrical heating element located in the water chamber, a dome closing the upper end of the air chamber, and hot air flues connected to said dome.

4. The combination in a heater with a pair of spaced walls forming an annular water chamber and an interior air chamber, and water tubes in said air chamber connected with the water chamber, of an electric heating element in the water chamber, a motor and impeller for air currents at the lower end of the air chamber, a dome at the upper end of the air chamber, and hot air flues connected to said dome.

In testimony whereof I affix my signature.

JAMES HANSON HUSSEY.